June 10, 1958   H. J. HELD ET AL   2,838,065
TRICKLE VALVE

Filed Sept. 12, 1955   2 Sheets-Sheet 1

INVENTORS
HANS J. HELD
JOHN WEITS
BY
Arthur H. Seidel
ATTORNEY

INVENTOR.
HANS J. HELD
JOHN WEITS
BY
Arthur H. Seidel
ATTORNEY

United States Patent Office 2,838,065
Patented June 10, 1958

2,838,065
TRICKLE VALVE

Hans J. Held, Lake Success, and John Weits, Westbury, N. Y., assignors to Ducon Company, Inc., Mineola, N. Y., a corporation of New York Application September 12, 1955, Serial No. 533,852

9 Claims. (Cl. 137—521)

This invention relates to a trickle valve, and more particularly to a trickle valve which may be used to control the flow of gases up through a conduit having suspended solid particles therein, and which permits the discharge of solid particles from a vertical conduit carrying such solid particles.

The so-called "fluid process" has gained widespread adoption in the petroleum and chemical industries. In this process, finely divided catalyst particles, such as catalyst particles having a mesh size of 80 mesh or smaller, are maintained suspended in a gas in the so-called "fluidized state" or "fluid state" during reaction conditions. While in this fluid state, these particles undergo the phenomenon known as hindered settling, namely they possess many of the properties of a liquid. Thus, they may be conveyed from one vessel to another through a conduit they develop a pressure head, etc.

In petroleum technology, in particular, it is the custom to contact the reactants to be treated with particles of such catalysts under greatly elevated temperatures. For example in petroleum cracking processes the cracking reaction is effected at a temperature in the range of 750 to 975° F. Under these high temperature conditions, contact between the crude hydrocarbon oil, normally a gas oil fraction, and the solid catalyst particles results in cracking of the crude oil fraction to desirable lower boiling products, such as gasoline and the like.

Fluid reactors, regenerators, and similar vessels must be provided with means for separating solids from gases. Such means must be positioned either in the upper portion of the reactor, or above the reactor in order to permit removal of entrained fluid catalysts from the gases, and to permit the retention of such entrained catalyst particles in the fluid vessel. Such separation means normally comprises a cyclone separator in which separation of the solid particles from the gas is effected by centrifugal motion, after which the solid particles are returned to the fluidized mass of particles within the fluid vessel, by a dip leg which descends into the fluid bed, either into the dilute phase of the fluid bed or the dense phase thereof.

Due to the flow of gas and solid particles through the cyclone separator, a pressure differential exists between the fluid vessel and the return dip leg of the cyclone separator. This pressure differental induces gaseous reactants being treated within the fluid vessel to flow upwardly through the dip leg and into the cyclone separator, instead of through the intended path; namely, through the fluid and solid inlet in the hopper of the cyclone separator. Such upward flow through the dip leg and the cyclone separator seriously interferes with the operational efficiency of the cyclone separator and may even prevent its satisfactory operation.

Furthermore, the placing of fluid vessels in operation has required an extended starting-up period in order to establish a barometric seal between the lower portion of the cyclone separator's dip leg and the surrounding vessel. Similarly, extended starting-up periods are required when upset conditions are encountered. Inasmuch as each day off-stream may cost many thousands of dollars in the case of large fluid vessels, the elimination of extended start-up periods, and the avoidance of difficulties in effecting a barometric seal between the cyclone separator dip leg and the surrounding vessel is most desirable.

Extensive efforts have been made to develop a trickle valve which would effect a satisfactory seal between the cyclone separator dip leg and the surrounding fluid vessel. However, such prior efforts have not proved fruitful, due to the many difficulties concomitant with achieving reliable valve operation at elevated temperatures and with the valve members being exposed to mixtures containing a gas and solid, and the tendencies of coke buildup, rust and corrosion to interfere with efficient valve operation.

It is an object of the present invention to provide an improved trickle valve.

It is a further object of the present invention to provide a trickle valve which will perform without malfunction under greatly elevated temperatures.

It is another object of the present invention to provide a trickle valve useful in conjunction with the dip leg of cyclone separators or the like.

Another object of the present invention is the provision of a trickle valve in which self-aligning seating of the valve plate is effected under a variety of adverse conditions without the use of bearings.

For the purpose of illustrating the invention there is shown in the drawings forms which are presently preferred; it being understood, however, that this invention is not limited to the precise arrangements and instrumentalities shown.

Reference should be had to the following drawings, in which like reference characters refer to like parts:

Figure 1:
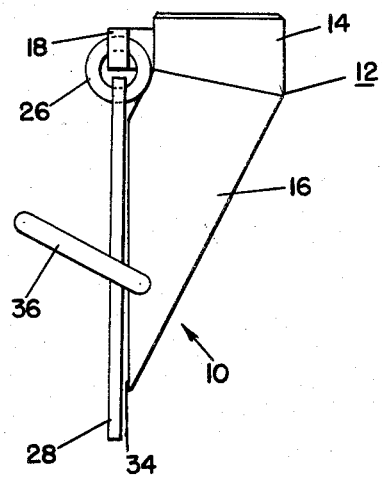
Figure 1 is a side elevation of one embodiment of the trickle valve of the present invention.
Figure 2:
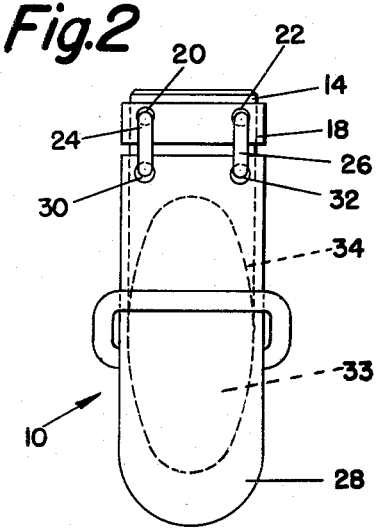
Figure 2 is a front elevation of the valve embodiment shown in Figure 1.

Referring to the drawings, and initially to Figures 1 and 2, valve 10 shown therein comprises a body member 12 consisting of an angularly bent conduit made up of portions 14 and 16; the upper portion 14 of which is lineal, and the under portion 16 of which is angularly disposed thereto at an angle to the vertical, the portions 14 and 16 forming the continuous conduit making up body member 12.

A T-shaped support bracket 18 is welded, or otherwise fixedly secured, to the outer surface of upper portion 14 of body member 12 proximate the junction with lower portion 16. The head of the T bracket 18 is a flat bar generally parallel to the axis of upper portion 14 and spaced somewhat therefrom. The T head of bracket 18 is provided with a pair of openings 20 and 22 through which respective annular or O-shaped hinges 24 and 26 are inserted. For the purposes of the present invention the diameter of the openings 20 and 22 must be appreciably greater than the diameter of the rod used for making O-shaped hinges 24 and 26, in order that O-shaped hinges 24 and 26 may move freely through openings 20 and 22 both vertically and laterally, notwithstanding the thermal expansion of the hinge metal at the valve operating temperature, which may be close to 1000° F.

A flat rectangular valve plate 28 is carried on O-shaped hinges 24 and 26, with the O-shaped hinges 24 and 26 passing through respective openings 30 and 32 in the upper portion of valve plate 28. As with openings 20 and 22, it is essential that the diameter of openings 30 and 32 be appreciably greater than the diameter of the rod used for making O-shaped hinges 24 and 26 in order to permit facile rotational movement of hinges 24 and 26 through openings 30 and 32, and also to permit lateral movement of hinges 24 and 26 in openings 30 and 32.

Valve plate 28 seats against the discharge opening 33 of lower portion 16 which is encompassed by valve seat 34. Valve plate 28 has an appreciably greater area, and greater maximum horizontal and vertical dimensions than valve seat 34, so that valve plate 28 may be seated against valve seat 34 in a plurality of laterally and vertically disposed positions. The valve plate 28 may move in a plane generally parallel to the valve seat plane or at an angle to such plane, permitting facile valve operation under adverse environmental conditions. Accordingly, the disposition of O-shaped hinges 24 and 26 within openings 20 and 22, or openings 30 and 32, to the right or left of center in respect to the centers of such openings will not adversely affect the seating of valve plate 28.

Lower portion 16 is provided with a stop 36 consisting of a bent rod welded or otherwise fixedly secured to the outer surface of lower portion 16 for limiting the backward movement of valve plate 28.

In the embodiment shown in Figures 1 and 2, the plane of the outer surface of valve seat 34 is spaced from the vertical so that there is no contact between valve plate 28 and valve seat 34 when the former is in its neutral position induced by the force of gravity. Thus, valve 10 is normally biased by gravity to an open position, and is closed by the pressure drop in body member 12, such pressure drop urging valve plate 28 against valve seat 34. When closed by such pressure drop, valve plate 28 will remain closed until there is a sufficient head of material within body member 12 to urge valve plate 28 away from valve seat 34, thereby permitting the material to be discharged from the discharge opening 33.

Inasmuch as valve plate 28 will remain closed when the pressure within the body member 12 is less than that of the surrounding environment, build-up of a pressure head equalling that of the environment surrounding body member 12 by material within body member 12 and the dip leg secured thereabove will be facilitated.

Figure 3:
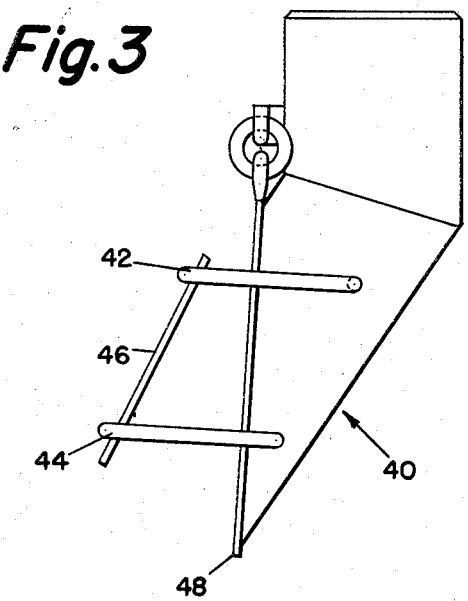
Figure 3 is a side elevation of another embodiment of the valve of the present invention.
Figure 4:
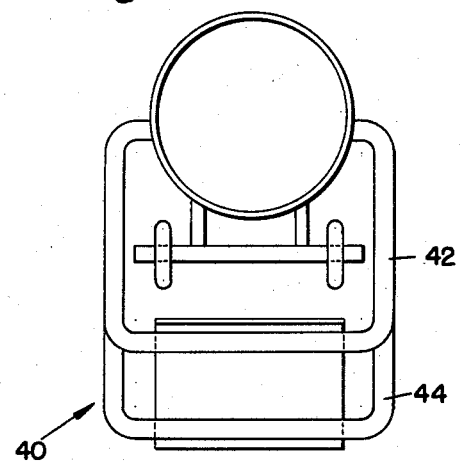
Figure 4 is a plan viewed from above of the valve embodiment shown in Figure 3.

The valve embodiment 40 shown in Figures 3 and 4 includes a pair of stops 42 and 44, which are spaced vertically from each other, and are joined by a flat stop plate 46 which passes therebetween, permitting a larger contact surface for engagement with valve plate 48.

In all other respects, valve embodiments 10 and 40 are similar.

Figure 5:
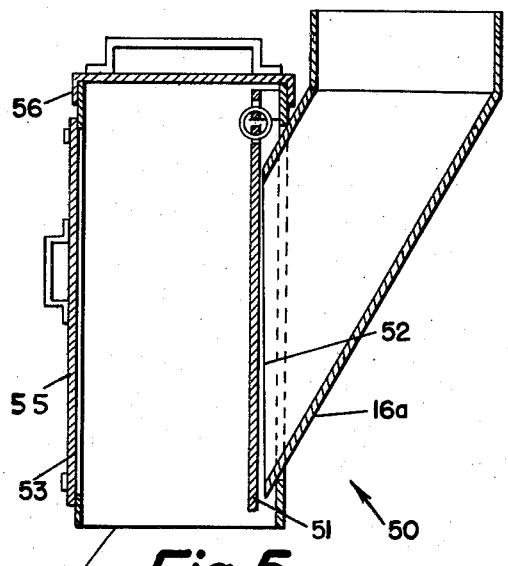
Figure 5 is a vertical sectional view of another embodiment of the valve of the preesnt invention, in which a housing is provided for the valve plate.
Figure 6:
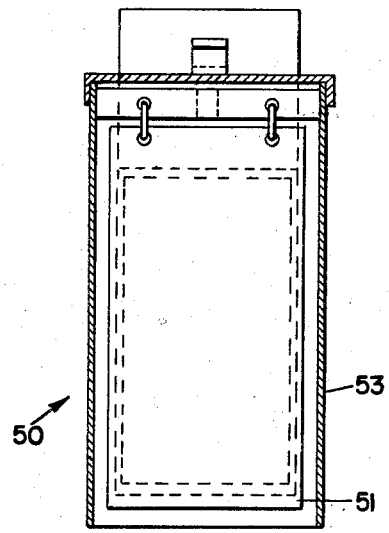
Figure 6 is a vertical sectional view at right angles to that of Figure 5.

In the valve embodiment designated 50 shown in Figures 5 and 6 the valve plate 51 and the portion of lower portion 16a proximate discharge opening 52 is encased within a housing 53 which functions as a stop for valve plate 51, and which also serves to keep the operation of the valve plate 51 unencumbered by particles disposed on the outside thereof. Housing 53 is provided with a discharge opening 54 at its bottom end through which material discharged from the discharge opening 52 of lower portion 16a may be transferred.

Housing 53 is further provided with a removable door 55 and cover 56 for permitting access to valve plate 51.

Figure 7:
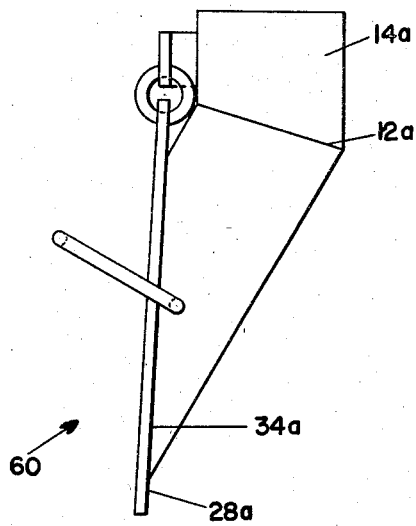
Figure 7 is an embodiment of the valve of the present invention similar to that of Figure 1 except that the valve plate is biased towards closed position, rather than towards an open position as in Figure 1.

Valve embodiment 60 shown in Figure 7 is similar to valve embodiment 10 save that the plane formed by the outer surface of the valve seat 34a is angularly disposed in respect to the vertical, so that the valve plate 28a is always biased to a closed position. This embodiment has the advantage in that a shorter conduit above the upper portion 14a of body member 12a, e. g. a shorter cyclone dip leg, need be provided to insure a given head and the requisite height of fluidized solids above the discharge opening of body member 12a needed to equal a predetermined head level may be reduced, since the gravity bias of valve plate 28a effects a tighter seal against valve seat 34a.

Figure 8:
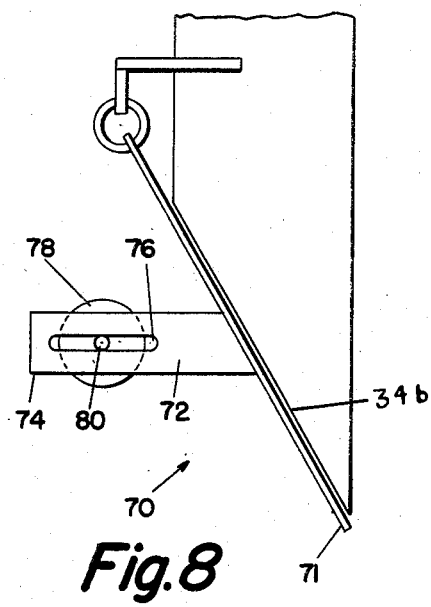
Figure 8 is another embodiment of the valve of the present invention in which the valve plate is biased to a closed position.

In valve embodiment 70 shown in Figure 8, the valve plate 71 is provided with a backwardly extending flange 72 having yoke arms 74 at its free end. Yoke arms 74 are provided with elliptical slots 76, and carry a counterweight 78 which is provided with trunnions 80, which are received in elliptical slots 76. Counterweight 78 urges valve plate 71 against valve seat 34b.

This application is a continuation in part of our application Serial No. 357,874, filed May 27, 1953, and now abandoned, for "Trickle Valve For Dust Collectors."

The present invention may be embodied in other specific forms without departing from the spirit or essential attributes thereof and, accordingly, reference should be made to the appended claims, rather than to the foregoing specification as indicating the scope of the invention.

We claim:

1. A trickle valve including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate having an inside diameter appreciably larger than the core thickness of the rod forming said hinge, the openings in said bracket and valve plate being so much larger than the core thickness of the rod forming the hinge as to permit both lateral and rotational movement of said hinge through each of said openings, said valve plate being juxtaposedly suspended in respect to the discharge opening of said conduit, the width and length of said valve plate being appreciably greater than the maximum width and length dimensions of the discharge opening of said conduit, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the face of the valve plate juxtaposed to the discharge opening of the conduit being flat, said juxtaposed face of the valve plate seating against the edge of the discharge opening of the conduit when said valve plate is disposed in its closed position, and said juxtaposed face of the valve plate being disposed away from the edge of the discharge opening of the conduit when the valve plate is disposed in its open position.

2. A trickle valve in accordance with claim 1 in which the closed loop hinge is an annular hinge.

3. A trickle valve including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate having an inside diameter appreciably larger than the core thickness of the rod forming said hinge, the openings in said bracket and valve plate being so much larger than the core thickness of the rod forming the hinge as to permit both lateral and rotational movement of said hinge through each of said openings, said valve plate being juxtaposedly suspended in respect to the discharge opening of said conduit, the width and length of said valve plate being appreciably greater than the maximum width and length dimensions of the discharge opening of said conduit, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the face of the valve plate juxtaposed to the discharge opening of the conduit being flat, said juxtaposed face of the valve plate seating against the edge of the discharge opening of the conduit when said valve plate is disposed in its closed position, and said juxtaposed face of the valve plate being disposed away from the edge of the discharge opening of the conduit when the valve plate is disposed in its open position, a stop for limiting the movement of said valve plate away from said discharge opening.

4. A trickle valve in accordance with claim 1 in which the discharge opening of the conduit is positioned in respect to the valve plate so that gravity biases the valve plate to seat against the edge of the discharge opening.

5. A trickle valve in accordance with claim 1 in which the discharge opening of the conduit is positioned in respect to the valve plate so that gravity biases the valve plate away from the edge of the discharge opening.

6. A trickle valve in accordance with claim 1 in which the bracket, valve plate and the discharge opening are enclosed within a housing.

7. A trickle valve in accordance with claim 1 in which the valve plate is provided with a projecting counterweight on its face opposite the face which is juxtaposed to the discharge opening of the conduit, which counterweight biases the valve plate to closed position.

8. A trickle valve including a conduit having an upper tubular portion, joined to an angularly disposed lower portion, a discharge opening in said lower portion, the edge of said discharge opening lying in a plane generally parallel to the plane of the axis of said upper portion, a bracket fixedly secured to the outer surface of said upper portion, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate having an inside diameter appreciably larger than the core thickness of the rod forming said hinge, the openings in said bracket and valve plate being so much larger than the core thickness of the rod forming the hinge as to permit both lateral and rotational movement of said hinge through each of said openings, said valve plate being juxtaposedly suspended in respect to the discharge opening of said lower portion, the width and length of said valve plate being appreciably greater than the maximum width and length dimensions of the discharge opening of said lower portion, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the face of the valve plate juxtaposed to the discharge opening of the lower portion being flat, said juxtaposed face of the valve plate seating against the edge of the discharge opening of the lower portion when said valve plate is disposed in its closed position, and said juxtaposed face of the valve plate being disposed away from the edge of the discharge opening of the lower portion when the valve plate is disposed in its open position.

9. A trickle valve including a conduit having an upper tubular portion, joined to an angularly disposed lower portion, a discharge opening in said lower portion, the edge of said discharge opening lying in a plane generally parallel to the plane of the axis of said upper portion, a bracket fixedly secured to the outer surface of said upper portion, said bracket having a plurality of openings therein, a plurality of annular hinges, each formed from a rod having a core thickness appreciably less than the inner diameter of said openings, one of said hinges being mounted through each of the openings in said bracket, a valve plate, each of said hinges passing through an opening in the upper portion of said valve plate whereby said valve plate is suspended from said hinges, each of said openings in said valve plate having an inside diameter appreciably larger than the core thickness of the rod forming said hinges, the openings in said bracket and valve plate being so much larger than the core thickness of the rod forming the hinges as to permit both lateral and rotational movement of said hinges through each of said openings, said valve plate being juxtaposedly suspended in respect to the discharge opening of said lower portion, the width and length of said valve plate being appreciably greater than the maximum width and length dimensions of the discharge opening of said lower portion, each of the openings in said valve plate extending between the face of said valve plate that is juxtaposed to the discharge opening of said conduit and the face opposite thereto whereby a portion of each of said hinges projects beyond said juxtaposed face and overlaps the portion of said conduit adjacent the discharge opening, and a portion of each of said hinges projects beyond the face opposite to the face juxtaposed to the discharge opening, the face of the valve plate juxtaposed to the discharge opening of the lower portion being flat, said juxtaposed face of the valve plate seating against the edge of the discharge opening of the lower portion when said valve plate is disposed in its closed position, and said juxtaposed face of the valve plate being disposed away from the edge of the discharge opening of the lower portion when the valve plate is disposed in its open position.

References Cited in the file of this patent

UNITED STATES PATENTS

| 274,139 | Pietsch | Mar. 20, 1883 |
| 520,250 | Barnum | May 22, 1894 |
| 1,320,960 | Anderson | Nov. 4, 1919 |
| 1,576,712 | Bold | Mar. 16, 1926 |
| 1,635,842 | Hirshstein | July 12, 1927 |
| 1,710,410 | Defenbaugh | Apr. 23, 1929 |

FOREIGN PATENTS

| 595,013 | Great Britain | of 1947 |
| 695,589 | Great Britain | of 1953 |